(12) United States Patent
Park

(10) Patent No.: US 7,193,667 B2
(45) Date of Patent: Mar. 20, 2007

(54) LIQUID CRYSTAL DISPLAY PANEL IMPLEMENTING BISTABLE LIQUID CRYSTAL AND METHOD OF FABRICATING THE SAME

(75) Inventor: Ku-Hyun Park, Kyonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 11/027,960

(22) Filed: Jan. 4, 2005

(65) Prior Publication Data

US 2005/0140854 A1 Jun. 30, 2005

Related U.S. Application Data

(62) Division of application No. 09/771,640, filed on Jan. 30, 2001, now Pat. No. 6,847,418.

(30) Foreign Application Priority Data

Feb. 1, 2000 (KR) .................. 2000-4911

(51) Int. Cl.
*G02F 1/1333* (2006.01)
(52) U.S. Cl. ........................ 349/88
(58) Field of Classification Search ............... 349/88, 349/187, 93, 86, 130
See application file for complete search history.

(56) References Cited

U.S. PATENT DOCUMENTS 5,691,795 A * 11/1997 Doane et al. ............... 349/169
5,831,700 A * 11/1998 Li et al. ..................... 349/88
6,122,024 A   9/2000 Molsen et al. .............. 349/88
6,133,975 A   10/2000 Li et al. ..................... 349/134
6,160,602 A   12/2000 Ikeno et al. ................ 349/139
6,266,109 B1  7/2001 Yamaguchi et al. ......... 349/86
6,452,651 B1  9/2002 Takami et al. .............. 349/88
6,490,022 B1  12/2002 Hoshino ..................... 349/153

FOREIGN PATENT DOCUMENTS

| JP | 9-281484 | 10/1997 |
| KR | 10-1998-3713 | 3/1998 |
| KR | 10-1999-43898 | 6/1999 |

OTHER PUBLICATIONS

Chen, et al.: "Homeotropic liquid-crystal device with two metastable states", *Appl. Phys. Lett.*, vol. 74, No. 25 (Jun. 25, 1999), pp. 3779-3781.
Tanaka, et al.: "A Bistable Twisted Nematic (BTN) LCD Driven by a Passive-Matrix Addressing", *Asia Display '95*, pp. 259-262.

* cited by examiner

*Primary Examiner*—Toan Ton
(74) *Attorney, Agent, or Firm*—Morgan, Lewis & Bockius, LLP

(57) ABSTRACT

A liquid crystal display panel implementing a bistable liquid crystal and fabricating the same is disclosed in the present invention. Specifically, a method of fabricating a liquid crystal display panel having first and second substrates, the method includes forming a first electrode on the first substrate, forming a second electrode on the second substrate, assembling the first and second substrates, forming a bistable twist nematic liquid crystal layer between the first and second substrates, wherein the bistable twist nematic liquid crystal layer having a monomer, aligning the bistable twist nematic liquid crystal layer by applying electric fields, and forming polymer networks by exposing the bistable twist nematic liquid crystal layer to light.

9 Claims, 7 Drawing Sheets

LIQUID CRYSTAL DISPLAY PANEL IMPLEMENTING BISTABLE LIQUID CRYSTAL AND METHOD OF FABRICATING THE SAME

This is a divisional application of application Ser. No. 09/771,640, filed on Jan. 30, 2001 now U.S. Pat. No. 6,847,418. This application claims the benefit of Korean Patent Application No. 2000-4911 filed on Feb. 1, 2000, which is hereby incorporated by reference.

BACKGROUND OF THE INVENTION

1. Field of the Invention

The present invention relates to a liquid crystal display (LCD) panel, and more particularly, to a liquid crystal display panel implementing a bistable liquid crystal and a method of fabricating the same. Although the present invention is suitable for a wide scope of applications, it is particularly suitable for improving a response time as well as reducing power consumption in the LCD panel.

2. Discussion of the Related Art

Recently, a liquid crystal display (LCD) panel with light, thin, and low power consumption characteristics is used in office automation equipment and video units. Such LCD's typically utilize an optical anisotropy of a liquid crystal (LC). Thin and long molecules of the LC cause an orientation alignment of the molecules. Therefore, applying electric fields to the molecules controls an alignment direction of the LC. When the alignment direction of the molecules in the LC is properly adjusted, the LC is aligned so that light is refracted along the alignment direction of the LC molecules. AS a result, image data is diplayed on the panel.

Currently, an active matrix (AM) LCD having a plurality of thin film transistors and pixel electrodes therein in the shape of an array matrix draws great attention. This is due to its high resolution and superiority in displaying moving pictures. Driving methods for such LCD's typically include a twisted nematic (TN) mode and a super twisted nematic (STN) mode.

A conventional liquid crystal display (LCD) device includes upper and lower substrates that are attached with each other, and an interposed liquid crystal, such as nematic, smectic, and cholesteric liquid crystals. A liquid crystal display device utilizes an electro-optic effect of the liquid crystal. A display panel consists of a plurality of liquid crystal cells. On the exterior surfaces of the upper and lower substrates, polarizers or retardation films are selectively attached.

FIG. 1 is a cross-sectional view illustrating a conventional LCD panel 20. As shown in FIG. 1, the LCD panel has lower and upper substrates 2 and 4, and an interposed liquid crystal layer 10. The lower substrate 2 includes a substrate 1, a TFT "S" as a switching element to change an orientation of liquid crystal molecules, and a pixel electrode 14 where a voltage is applied to the liquid crystal layer 10 in accordance with signals from the TFT "S". The upper substrate 4 has a color filter 8 for implementing color. A common electrode 12 on is further formed the color filter B. The common electrode 12 serves as an electrode for applying a voltage to the liquid crystal layer 10. The pixel electrode 14 is arranged over a pixel portion "P", i.e., a display area. Further, to prevent leakage of the liquid crystal layer 10 between the substrates 2 and 4, the substrates 2 and 4 are sealed by a sealant 6. The nematic, smectic, and cholesteric liquid crystals are most widely used in the above-mentioned LCD panel.

FIGS. 2A to 2C illustrate various types of liquid crystal molecules in the liquid crystal layer. More specifically, FIG. 2A is a schematic view of the nematic liquid crystal having each rod-like molecule that fluctuates quite rapidly. The molecules of the nematic liquid crystal have a definite orientation order expressed by a unit vector "ñ" called a director. The smectic liquid crystal is shown in FIG. 2B. The molecules of the smectic liquid crystal have a layered structure in which the molecular orientation is perpendicular or nearly perpendicular to the layer. As shown in FIG. 2C, in the cholesteric liquid crystal, the director ñ changes its orientation gradually along a helical axis. The helical axis coincides with the optical axis in the cholesteric liquid crystal. Among the three different types of liquid crystals, the nematic liquid crystal is most widely used in liquid crystal display devices because it has the strongest dispersion characteristic.

In general, liquid crystals for liquid crystal display panel must have the following characteristics. First of all, a the liquid crystals should maintain its phase in the range of low to high temperatures, so that it is operable in the wide temperature range. Also, liquid crystals should be chemically and optically stable for a long period of time. They should have a low viscosity and a fast response time. In addition, they must have highly ordered molecular alignments, thereby providing a high contrast ratio. Further, the liquid crystals should have a large dielectric anisotropy and a low operating voltage.

An electro-optic effect enables electrical modulation of light by changing an alignment of the liquid crystal molecules through the applied electric fields. The electro-optic effect of the liquid crystals is caused by the electrical modulation of light when an optical characteristic of the liquid crystals changes. The electrical modulation occurs when an alignment change of the liquid crystal molecules by applying electric fields to the liquid crystal.

Among the various types of nematic liquid crystals, a twisted nematic (TN) liquid crystal and a super twisted nematic (STN) liquid crystal are mostly used. For the TN LCD panel, a nematic liquid crystal is interposed between lower and upper transparent electrodes (shown as the common electrode 12 and the pixel electrode 14 in FIG. 1). Those electrodes are respectively treated to induce a certain molecular arrangement, so that a gradual rotation of the molecules occurs between the lower transparent electrode and the upper transparent electrode until a twist angle of 90 degrees is achieved. In the STN LCD panel, a twist angle increases to 180 to 360 degrees.

A high-density integrated circuit having a very fast response time has been used as a switching device for the LCD panel. A new mode for the LCD panel is required to keep up with the high-density integrated circuit. For the above-mentioned reason, a bistable twisted nematic (BTN) liquid crystal is introduced. The bistable twisted nematic liquid crystal is a nematic liquid crystal with a chiral dopant. A conventional BTN liquid crystal display panel is superior to the conventional simple matrix addressing liquid crystal panel such as an STN liquid crystal panel. For example, the BTN has characteristics of a wide viewing angle, a fast response time, and a high contrast ratio.

As shown in FIG. 3, in its first state, a conventional BTN liquid crystal 30 is aligned to have a twist angle of "φ" and be parallel to the substrates 2 and 4. With sufficiently high electric fields (hereinafter referred to as a reset electric field) applied across the BTN liquid crystal via a voltage source 40 of FIG. 4, the BTN liquid crystal becomes unstable in terms of an energy level, the boundaries between molecular layers are changed. Thus, disclination lines appear. Subsequently, the BTN liquid crystal 30 switches to the second state of a homeotropic alignment where molecules rotate and are perpendicular to the substrates 2 and 4. Therefore, with a reset electric field applied across the BTN liquid crystal 30, the BTN liquid crystal molecules arranges in the homeotropic alignment and becomes stable in terms of an energy level.

Thereafter, as shown in FIGS. 5A and 5B, when the reset electric field level is decreased, the BTN liquid crystal 30 quickly changes (switches) to the third state where the molecules are aligned with a twist angle of "$\phi-\pi$" or "$\phi+\pi$" according to decrease in the reset electric field. The above-mentioned third state having a twist angle of "$\phi-\pi$" or "$\phi+\pi$" is very different, in energy level, from the first state. However, it is the same as the second state in energy level. Since the third state is very different from the first state in its energy level, a disclination line is present between the first state and the third state and serves as an energy barrier. The energy barrier delays an inverted transition from the third state to the first state.

For the above-mentioned reason, the third state is the most stable. In addition, when another electric field is properly applied across the BTN liquid crystal in the third state, the BTN liquid crystal maintains its third state for a longer period of time. Specifically, if the reset electric field applied with the BTN liquid crystal is rapidly decreased, a backflow wave is induced, so that the BTN liquid crystal is aligned to be homeotropic with a first twist angle of $\Phi+\pi$. Conversely, if the reset electric field is gradually decreased, the BTN liquid crystal is aligned to be homeotropic with a second twist angle of $\phi-\pi$. A changing or switching speed of the BTN liquid crystal is less than 10 ms. In addition, as above-mentioned, when a proper electric field is additionally applied to the BTN liquid crystal in the third state, the third state lasts for more than 1 second.

FIG. 6 is a flow chart illustrating a switching operation of a LCD panel using a typical BTN liquid crystal. In the first state, the BTN liquid crystal has a twist angle of 180 degrees. When a reset voltage $V_R$ is applied to the BTN liquid crystal, the BTN liquid crystal arranges as a homeotropic alignment. As soon as the reset voltage $V_R$ is stopped, a selection voltage $V_S$ is applied to the BTN liquid crystal. If the selection voltage $V_S$ is higher than a saturation voltage $V_{sat}$, the BTN liquid crystal makes a transition to the first quasi-stable state where molecules are aligned with a first twist angle of 0 degree. Conversely, if the selection voltage $V_S$ is lower than the saturation voltage $V_{sat}$, the BTN liquid makes a transition to the second quasi-stable state where molecules are aligned with a second twist angle of 360 degrees. The first quasi-stable state becomes "ON" state while the second quasi-stable state becomes "OFF" state.

When a time-division operating voltage shown in FIG. 7 is applied to the above-mentioned BTN LCD panel, the first quasi-stable state switches to the second quasi-stable state, and vice versa. FIG. 7 shows a basic waveform of the operating voltage for the BTN LCD panel.

During a reset period $T_R$, the reset voltage $V_R$ is applied such that the BTN liquid crystal changes from the first state alignment to the homeotropic alignment that is very different from the first state alignment in energy level. During a selection period $T_S$, the BTN liquid crystal selects the first quasi-stable alignment or the second quasi-stable alignment according to the level of the selection voltage $V_S$. During a retention period $T_R$, the selected quasi-stable alignment lasts or a certain period of time with a retention voltage $V_r$ applied with the BTN liquid crystal.

Specifically, in applying an actual voltage signal to a pixel electrode (reference 14 of FIG. 1), if a voltage higher than a threshold voltage is applied during the selection period, the BTN liquid crystal molecules are aligned to have the first twist angle of $\phi+\pi$, which is OFF state. Conversely, if a voltage lower than the threshold voltage is applied during the selection period, the BTN liquid crystal molecules are aligned to have the first twist angle of $\phi-\pi$, which is ON state. The higher selection voltage has the same effect as the reset voltage is gradually decreased, while the lower selection voltage has the same effect as the reset voltage is rapidly decreased. When the lower selection voltage is applied to the BTN liquid crystal in the second state, the backflow wave is induced.

As mentioned previously, if a twist angle of the first state is 180 degrees, the first twist angle of the first quasi-stable state, ON state, is 0 degree, while the second twist angle of the second quasi-twist state, OFF state, is 360 degrees. The above-mentioned ON and OFF states only refer to the different twist angles of the quasi-stable states. In other words, light transmittance or light reflectivity of the BTN LCD device may change according to some design factors of the BTN liquid crystal panel, such as cell thickness, refractive anisotropy, or angle of polarizers. Namely, according to the above-mentioned design factors of the BTN liquid crystal panel, ON and OFF states may respectively refer to white and black states, or black and white states.

As explained, the conventional BTN liquid crystal panel can switch ON and OFF states via changing only a twist angle, it is superior to the TN-LCD or STN-LCD panel in viewing angles as well as a response time and a contrast ratio. In addition, the conventional BTN liquid crystal is also operated via the simple matrix addressing operation.

However, a reset voltage of about 30 V is applied in the conventional BTN liquid crystal panel to make a transition from the first state alignment to the homeotropic alignment. Therefore, the conventional BTN liquid crystal panel has a disadvantage in a high power consumption. To overcome the above-mentioned problem, a homeotropic BTN liquid crystal panel using a vertical alignment layer was introduced. However, in this case, there is a limitation in which a liquid crystal should have a negative dielectric anisotropy.

SUMMARY OF THE INVENTION

Accordingly, the present invention is directed to a liquid crystal display panel and a method of fabricating the same that substantially obviate one or more of the problems due to the limitations and disadvantages of the related art.

An object of the present invention to provide a bistable twisted nematic (BTN) liquid crystal display panel having a fast response time and low power consumption.

Another object of the present invention to provide a BTN liquid crystal display panel that can adopt various types of liquid crystals.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of fabricating a liquid crystal display panel having first and second substrates includes the steps of forming a first electrode on the first substrate, forming a second electrode on the second substrate, assembling the first and second substrates, forming a bistable twist nematic liquid crystal layer between the first and second substrates, wherein the bistable twist nematic liquid crystal layer having a monomer, aligning the bistable twist nematic liquid crystal layer by applying electric fields, and forming polymer networks by exposing the bistable twist nematic liquid crystal layer to light.

In another aspect of the present invention, a method of fabricating a liquid crystal display panel having first and second substrates includes the steps of injecting a bistable liquid crystal mixed with a chiral dopant and a monomer between the first and second substrates, wherein the bistable liquid crystal is aligned with a twist angle of 180 degrees, applying a reset voltage to the bistable liquid crystal, and polymerizing the monomer in the bistable liquid crystal, thereby forming a plurality of polymer networks.

In a further aspect of the present invention, A liquid crystal display panel includes first and second substrates and a liquid crystal layer between the first and second substrates, wherein the liquid crystal layer has a photo-polymerized monomer and is aligned perpendicular to the substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to an embodiment of the present invention, the example of which is illustrated in the accompanying drawings.

Figure 8A:
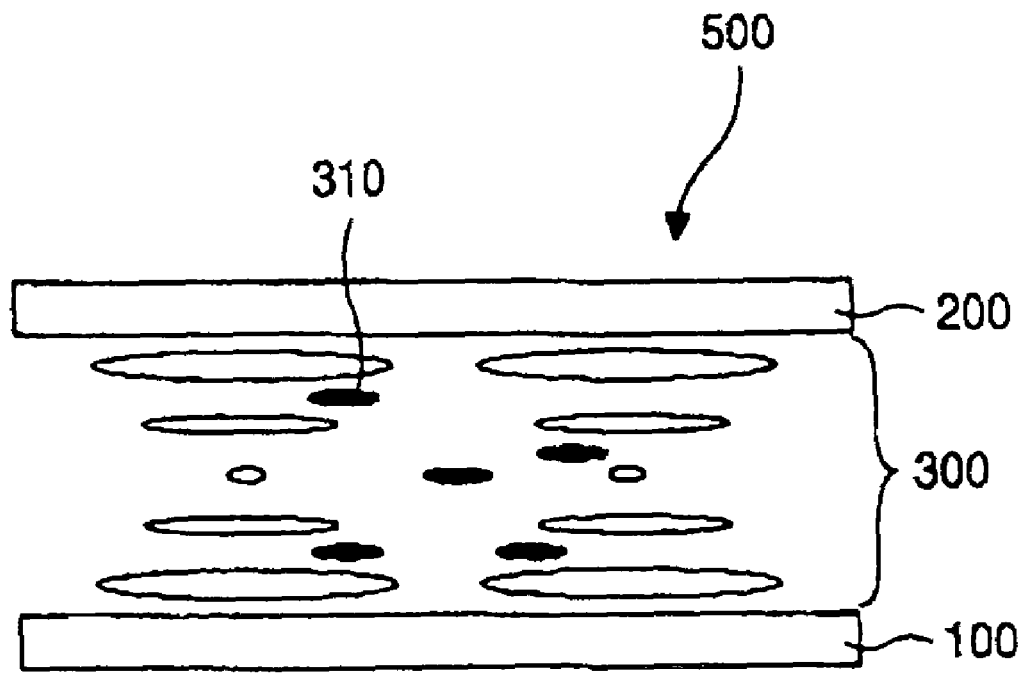
FIGS. 8A to 8C are schematic cross-sectional views illustrating the process steps of fabricating method of a BTN liquid crystal display panel according to a preferred embodiment of the present invention.
Figure 8B:
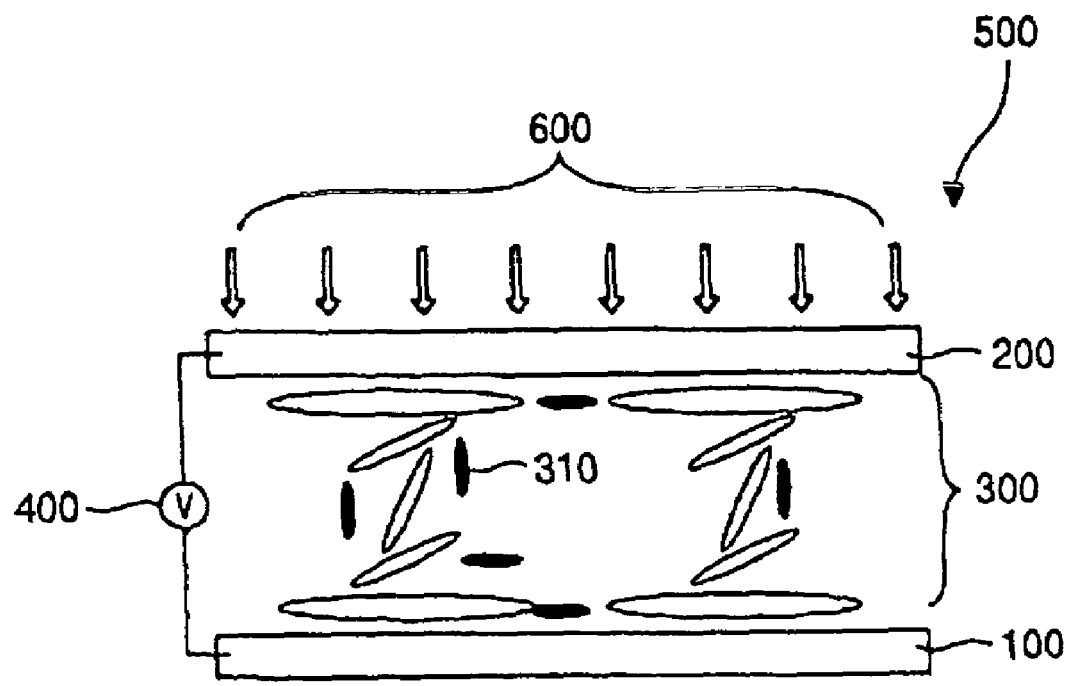
Figure 8C:
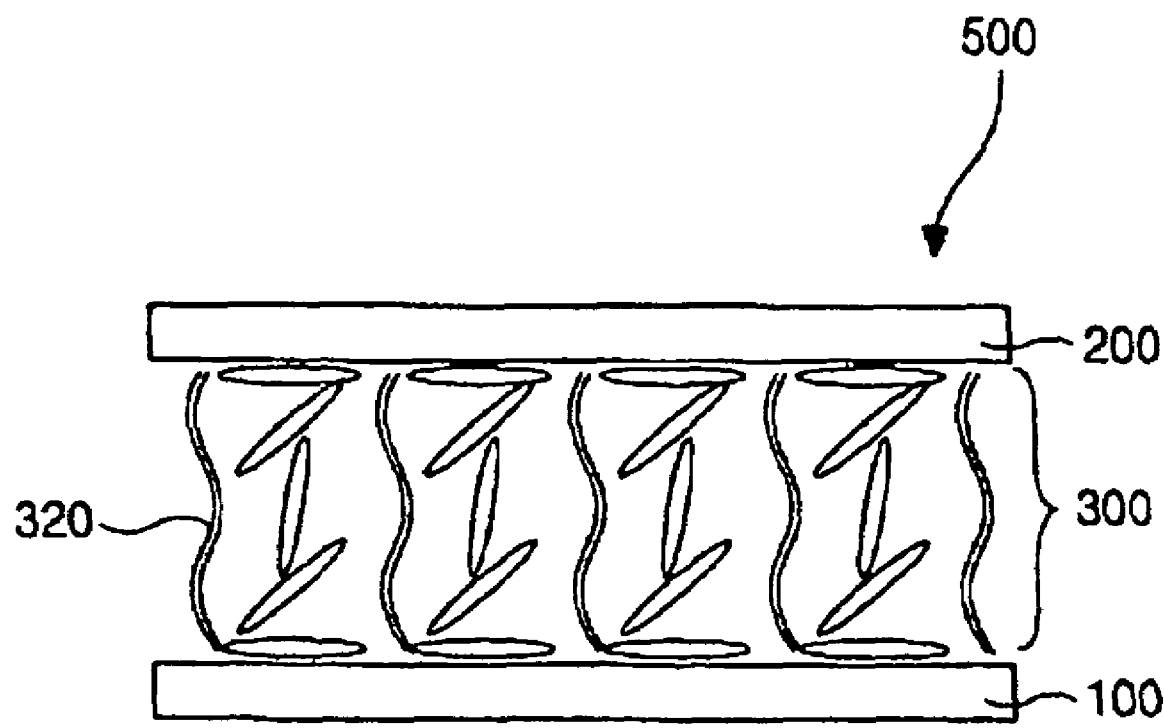

In the preferred embodiment, a small amount of monomer polymerized by light is mixed in a BTN liquid crystal to improve stability of the BTN liquid crystal. FIGS. 8A to 8C illustrate a fabricating process for a BIN liquid crystal display panel 500 according to the preferred embodiment of the present invention.

Figure 1:
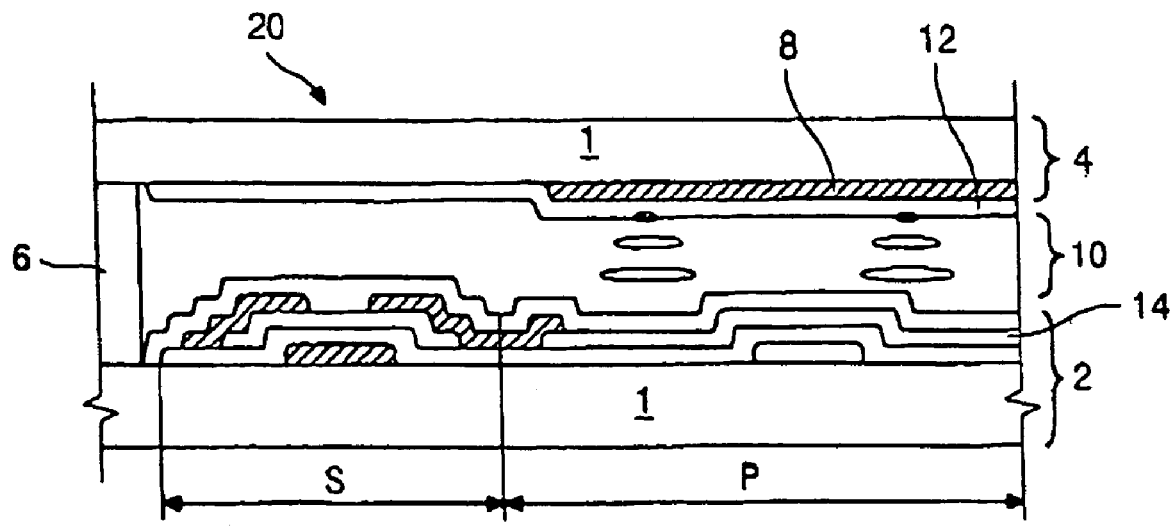
FIG. 1 is a cross-sectional view of a conventional TFT liquid crystal display panel.
Figure 2A:
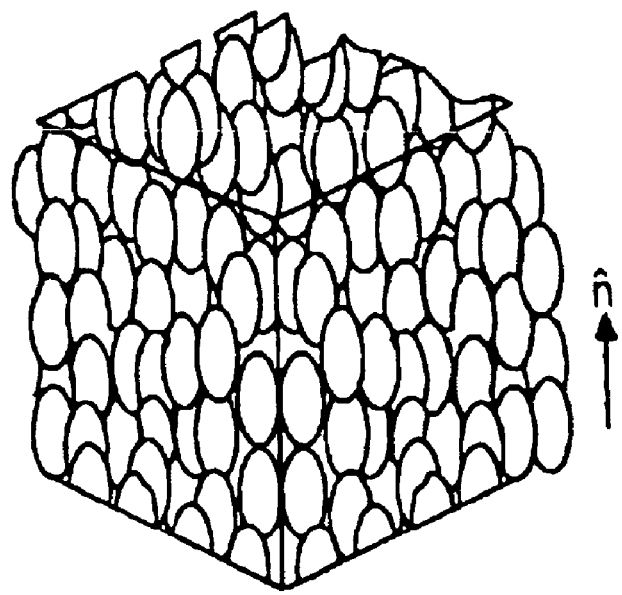
FIGS. 2A to 2C illustrate schematic views of molecular alignments of nematic, smectic, and cholesteric liquid crystals, respectively.
Figure 2B:
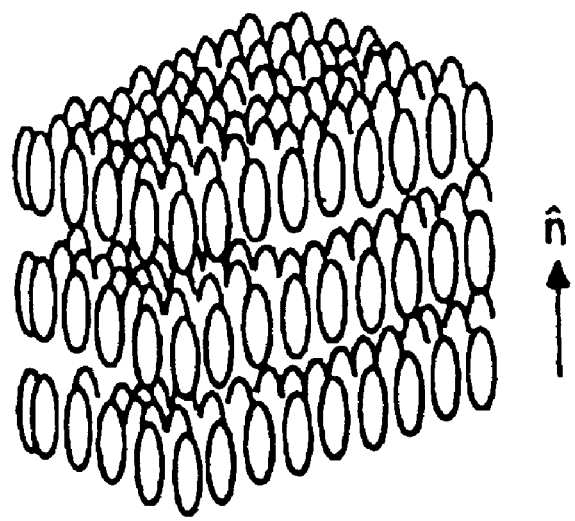
Figure 2C:
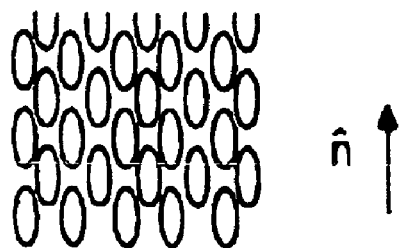
Figure 2C:
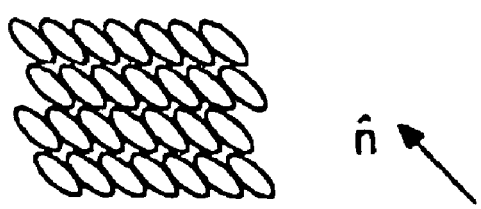
Figure 2C:
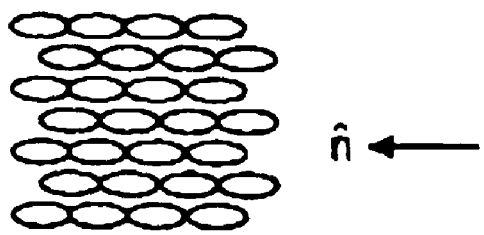
Figure 3:
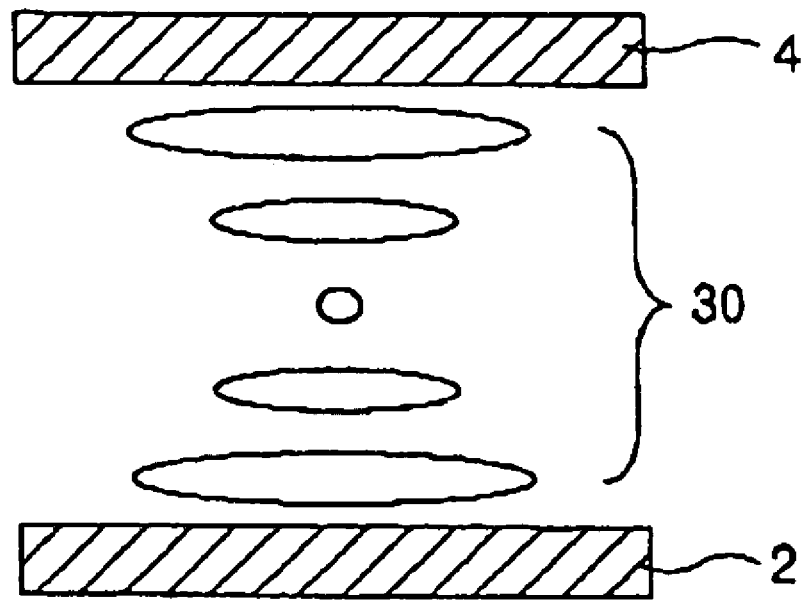
FIGS. 3, 4, 5A, and 5B are schematic cross-sectional views illustrating an operation mode of a conventional BTN-LCD panel.
Figure 4:
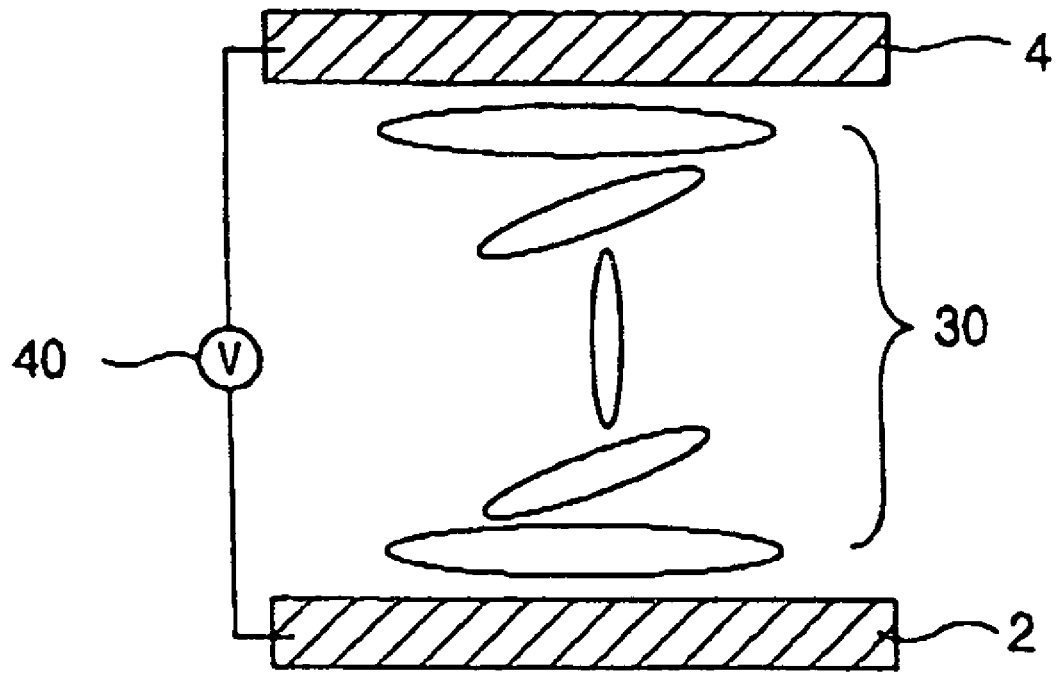

Initially, as shown in FIG. BA, the BTN liquid crystal 300 is mixed with a chiral dopant and the above-mentioned monomer 310. The BTN liquid crystal 300 is interposed between a lower substrate 100 and an upper substrate 200 to form the BTN liquid crystal panel 500. Each of the lower and upper substrates 100 and 200 has a transparent conductive electrode (shown in reference 14 and 12 of FIG. 1). In the first state, the BTN liquid crystal molecules 300 are aligned with a twist angle of 180 degrees. Preferably, the transparent conductive electrodes (not shown) are selected from a material including indium tin oxide (ITO) and indium zinc oxide (IZO).

Figure 5A:
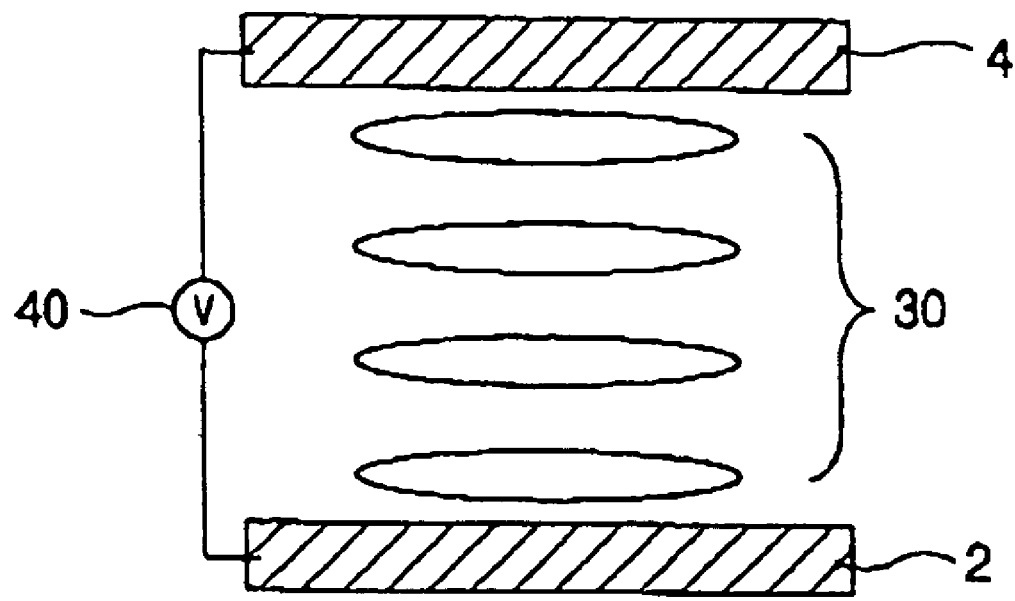
Figure 5B:
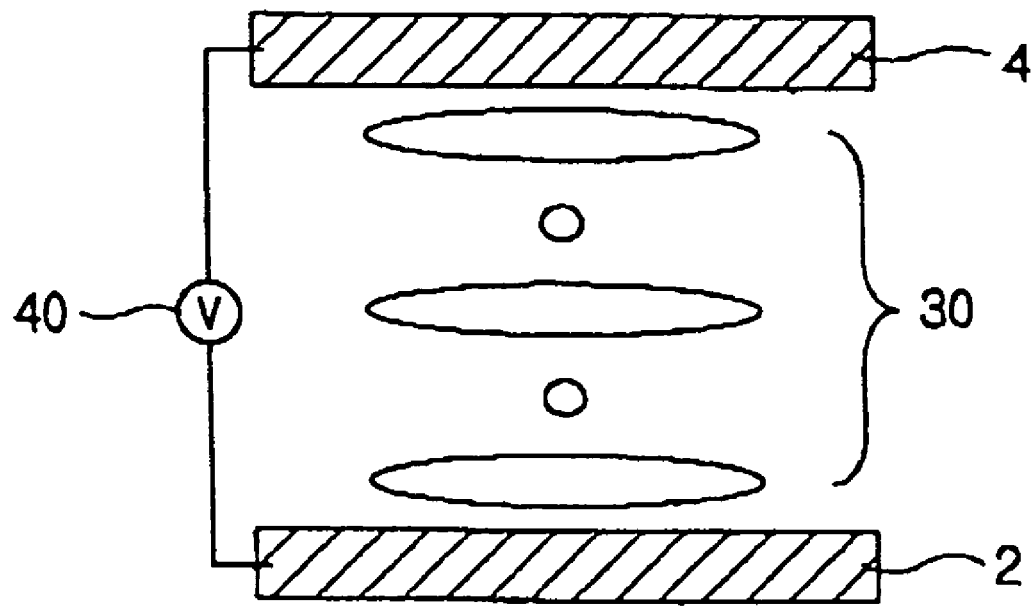
Figure 6:
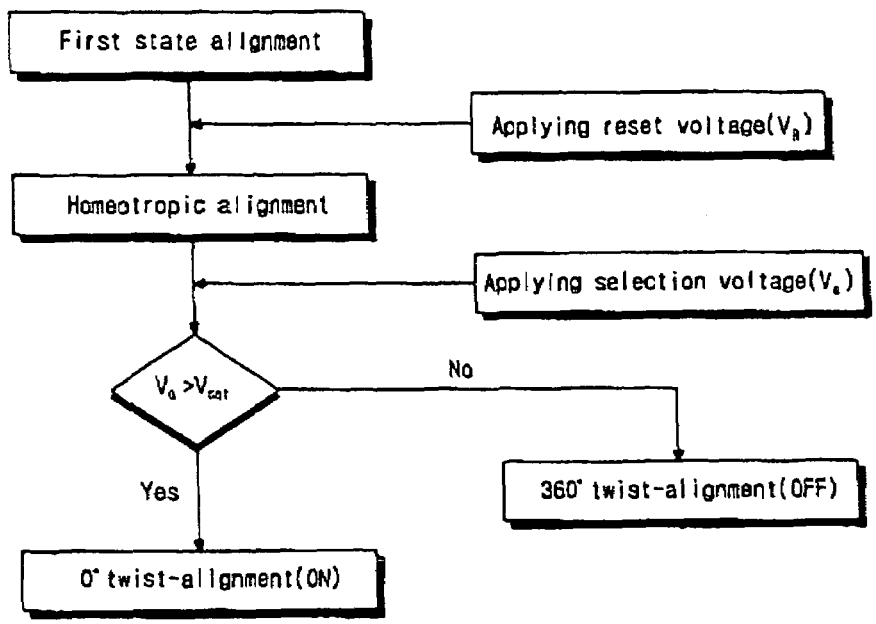
FIG. 6 is a flow chart illustrating a switching operation of a LCD device utilizing the conventional BTN liquid crystal.

Next, as shown in FIG. BB, a voltage source 400 applies electric fields to the BTN liquid crystal 300 through the transparent conductive electrodes (not shown) of the lower and upper substrates 100 and 200. The molecules are arranged as a homeotropic alignment, so that they are aligned perpendicular to the substrates 100 and 200. In addition, light 600 is incident on the BTN liquid crystal panel 500. The above-mentioned electric fields have the same level as a reset voltage "$V_R$" that is applied for the conventional BTN liquid crystal panel in the reset period shown in FIG. 7. More specifically, the electric fields include a voltage in the range of 20 to 30 V. As the light 600 is incident on the BTN liquid crystal 300, the monomer 310 is polymerized. FIG. 5C shows polymer networks 320 formed by the above-mentioned polymerization. Preferably, the light 600 includes ultraviolet rays.

Figure 7:
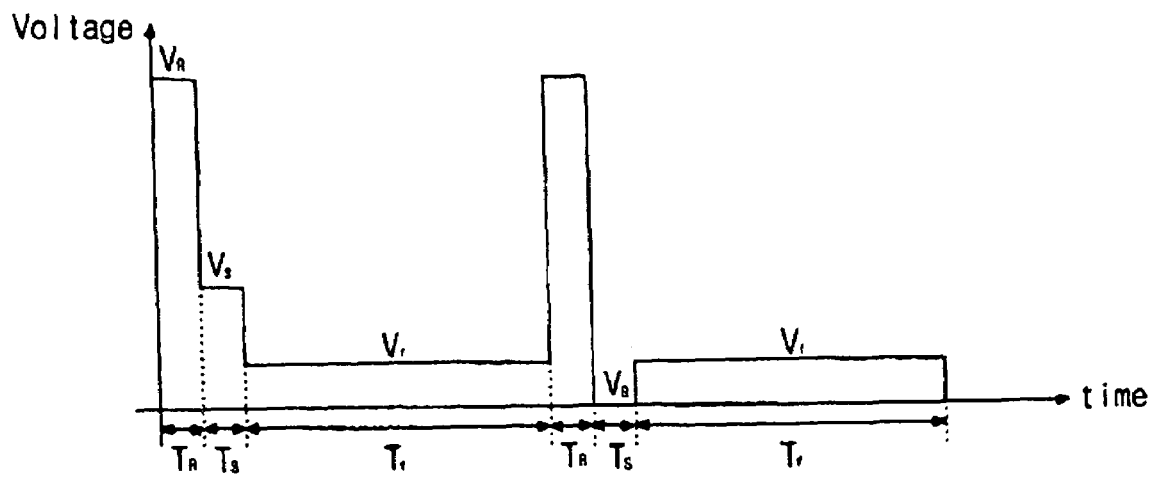
FIG. 7 is a diagram illustrating an operation voltage signal for the conventional BTN liquid crystal panel.

When the polymer networks 320 are formed, the BTN liquid crystal 300 maintains its homeotropic alignment (or the reset state) regardless of the electric fields applied to the BTN liquid crystal 300. In other words, after the polymer networks 320 are formed, the polymer networks 320 serves to maintain the homeotropic alignment. Thus, the molecules are aligned to be homeotropic in the first state alignment without applying the electric fields. Therefore, the reset voltage $V_R$ of FIG. 7 is not required to reset the homeotropic alignment continually because of the polymer networks 320. Accordingly, since the BTN liquid crystal 300 in the present invention always maintains the homeotropic alignment in its first state alignment without applying a reset voltage $V_R$, an LCD panel is operated by only applying a selection voltage $V_S$ of FIG. 7.

In summary, in the present invention, the photo-polymerized monomer 310 is mixed in the BTN liquid crystal 300. Electric fields are applied to the BTN liquid crystal 300. Then, light is incident on the BTN liquid crystal 300, so that the monomer 310 is polymerized to form the polymer networks 320. Due to the polymer networks 320, the BTN liquid crystal 300 always resets to the homeotropic alignment without the reset voltage $V_R$. Accordingly, power consumption due to the reset voltage $V_R$ is much reduced in the present invention.

It is apparent to those skilled in the art that various modifications and variations can be made in the liquid crystal display panel implementing a bistable liquid crystal and method of fabricating the same of the present invention without departing from the spirit or scope of the inventions. Thus, it is intended that the present invention covers the modifications and variations of this invention provided they come within the scope of the appended claims and their equivalents.

What is claimed is:

1. A method of fabricating a liquid crystal display panel having first and second substrates, the method comprising the steps of:

forming a first electrode on the first substrate;

forming a second electrode on the second substrate;

assembling the first and second substrates;

forming a bistable twist nematic liquid crystal layer between the first and second substrates, wherein the bistable twist nematic liquid crystal layer having a monomer, and the monomer is aligned perpendicular to the first and second substrates;

aligning the bistable twist nematic liquid crystal layer by applying electric fields; and forming a polymer networks by exposing the bistable twist nematic liquid crystal layer to light, wherein the step of aligning the bistable twist nematic liquid crystal layer and the step of forming the polymer networks are simultaneously performed.

2. The method of claim 1, wherein the light includes ultraviolet rays.

3. The method of claim 1, wherein the electric fields includes a voltage in the range of 20 to 30 V.

4. The method of claim 1, wherein the first and second electrodes are selected from a group consisting of indium tin oxide (ITO) and indium zinc oxide (IZO).

5. The method of claim 1, wherein the bistable twist nematic liquid crystal contains a chiral dopant.

6. A method of fabricating a liquid crystal display panel having first and second substrates, the method comprising the steps of:

injecting a bistable liquid crystal mixed with a chiral dopant and a monomer between the first and second substrates, wherein the bistable liquid crystal is aligned with a twist angle of 180 degrees, and the monomer is aligned perpendicular to the first and second substrates;

applying a reset voltage to the bistable liquid crystal; and polymerizing the monomer in the bistable liquid crystal, thereby forming a plurality of polymer networks, wherein the step of applying the reset voltage and the step of polymerizing the monomer are simultaneously performed.

7. The method of claim 6, wherein the bistable liquid crystal in the step of polymerizing the monomer maintains an homeotropic alignment.

8. The method of claim 6, wherein the step of polymerizing the monomer includes exposing UV light to the bistable liquid crystal.

9. The method of claim 6, wherein the reset voltage is in the range of 20 to 30 V.

* * * * *